United States Patent
Sasaki et al.

(10) Patent No.: US 10,576,852 B2
(45) Date of Patent: Mar. 3, 2020

(54) VEHICLE SEAT

(71) Applicant: TACHI-S CO., LTD., Akishima-shi, Tokyo (JP)

(72) Inventors: Ayaru Sasaki, Tokyo (JP); Hideki Kamata, Tokyo (JP); Yasuyuki Ito, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 237 days.

(21) Appl. No.: 15/531,438

(22) PCT Filed: Dec. 14, 2015

(86) PCT No.: PCT/JP2015/084872
§ 371 (c)(1),
(2) Date: May 28, 2017

(87) PCT Pub. No.: WO2016/104200
PCT Pub. Date: Jun. 30, 2016

(65) Prior Publication Data
US 2017/0259718 A1  Sep. 14, 2017

(30) Foreign Application Priority Data

Dec. 25, 2014 (JP) ................. 2014-262277

(51) Int. Cl.
*B60N 2/58* (2006.01)
*B60N 2/70* (2006.01)
(Continued)

(52) U.S. Cl.
CPC ............ *B60N 2/5875* (2013.01); *A47C 31/02* (2013.01); *B60N 2/5891* (2013.01); *B60N 2/70* (2013.01);
(Continued)

(58) Field of Classification Search
CPC ...... B60N 2/5816; B60N 2/5875; B60N 2/58; B60N 2/70; B60N 2/7011; B60N 2/7017;
(Continued)

(56) References Cited

U.S. PATENT DOCUMENTS 2,659,421 A * 11/1953 Wass .................... A47C 27/003
    5/657.5
3,940,812 A * 3/1976 DiForti .................... A43B 9/00
    112/418
(Continued)

FOREIGN PATENT DOCUMENTS

GB     739891 A * 11/1955 ........... B60N 2/7058
JP     H11-221131 A    8/1999

OTHER PUBLICATIONS

International Search Report from International Patent Application No. PCT/JP2015/084872, dated Mar. 15, 2016.
(Continued)

*Primary Examiner* — Ryan D Kwiecinski
(74) *Attorney, Agent, or Firm* — SGPatents PLLC

(57) ABSTRACT

The vehicle seat is structured by covering the pad surface with the surface layer provided with the beading, which prevents the beading formed on the vehicle seat from being rubbed and worn out by clothing of the occupant who is getting on or off the vehicle under pressure applied by the thigh or the back of the occupant, and further prevents dislocation of the beading on the seat under pulling force applied by the thigh of the occupant who is getting on or off the vehicle. The pad has a groove in which the beading is embedded. The beading is embedded in the groove famed in the pad, and the surface layer for enclosing the beading core of the beading is bonded and fixed to the bottom surface of the groove.

10 Claims, 4 Drawing Sheets

(51) Int. Cl.
*A47C 31/02* (2006.01)
*A47C 7/24* (2006.01)

(52) U.S. Cl.
CPC .............. *B60N 2/7017* (2013.01); *A47C 7/24* (2013.01); *B60N 2/5866* (2013.01)

(58) Field of Classification Search
CPC .... B60N 2/5891; B60N 2/5866; A47C 31/02; A47C 7/24
See application file for complete search history.

(56) References Cited

U.S. PATENT DOCUMENTS

| | | | | |
|---|---|---|---|---|
| 4,093,773 A * | 6/1978 | Danko | .................. | B29C 59/043 |
| | | | | 428/365 |
| 4,579,388 A * | 4/1986 | Urai | .......................... | B60N 2/58 |
| | | | | 297/452.26 |
| 4,625,350 A * | 12/1986 | Urai | .......................... | B29C 65/04 |
| | | | | 156/155 |
| 4,650,251 A * | 3/1987 | Shimada | ................ | A47C 31/00 |
| | | | | 156/73.1 |
| 10,112,514 B2 * | 10/2018 | Lemarchand | .......... | D05B 15/00 |

OTHER PUBLICATIONS

Office Action dated Jul. 20, 2018, in Chinese Patent Application No. 201580066298.9.

\* cited by examiner

VEHICLE SEAT

TECHNICAL FIELD

The present invention relates to a vehicle seat, specifically, the vehicle seat configured to have a beading formed on the seat surface.

BACKGROUND ART

Conventionally, there is a vehicle seat in which a beading is formed on its surface for designability purpose. The beading is formed on the vehicle seat surface along the horizontal direction or the vertical direction. Meanwhile, as disclosed in Patent Literature 1, the seat pad is provided with cushion members each exhibiting different strength along the beading, and has a V-like groove along the boundary between the cushion members. As the beading is pressed by the thigh of the occupant who is getting on or off the vehicle, the sewn part of the beading is designed to be sunk in the softer cushion member of the V-like groove.

CITATION LIST

Patent Literature

PTL 1: Japanese Unexamined Patent Application Publication No. 11-221131

SUMMARY OF INVENTION

Technical Problem

According to the beading attachment structure as disclosed in Patent Literature 1, when the driver is not seated, the beading protrudes from the vehicle seat surface. Accordingly, upon getting-on-off of the driver, the driver's thigh may rub the beading under pressure via the clothing. As a result, the beading is worn out to break the surface layer which covers the beading surface. This may cause the inner core member to be exposed.

The occupant who is getting on or off the vehicle is likely to apply the pulling force along the vehicle seat via the thigh or the like, which may cause disengagement of the beading from the groove of the seat, resulting in dislocation from the original position.

The present invention provides the vehicle seat configured to prevent the beading formed on the vehicle seat from being rubbed and worn out by clothing of the occupant who is getting on or off the vehicle, while having the beading pressed by the occupant's thigh, and to prevent dislocation of the beading on the vehicle seat under the pulling force applied by the occupant's thigh upon getting on or off the vehicle.

Solution to Problem

In order to solve the problem, the present invention provides the vehicle seat formed by covering a surface of a pad with a surface layer provided with a beading. The pad has a groove in which the beading is embedded. The beading is embedded in the groove formed in the pad, and the surface layer which encloses a beading core of the beading is bonded and fixed to a bottom surface of the groove.

In order to solve the problem, the present invention provides the vehicle seat formed by covering a surface of a pad with a surface layer provided with a beading. The pad has a groove in which the beading is embedded. The beading sewn to the surface layer is embedded in the groove formed in the pad so that a top of the beading is equal in height to an upper surface of the surface layer that covers both sides of the groove formed in the pad. The surface layer for enclosing a beading core of the beading is bonded and fixed to a bottom surface of the groove.

Advantageous Effects of Invention

The present invention provides the vehicle seat configured to prevent the beading formed on the vehicle seat from being rubbed and worn out by clothing of the occupant who is getting on or off the vehicle, while having the beading pressed by the occupant's thigh, and to prevent dislocation of the beading on the vehicle seat under the pulling force applied by the occupant's thigh upon getting on or off the vehicle.

DESCRIPTION OF EMBODIMENTS

Figure 1:
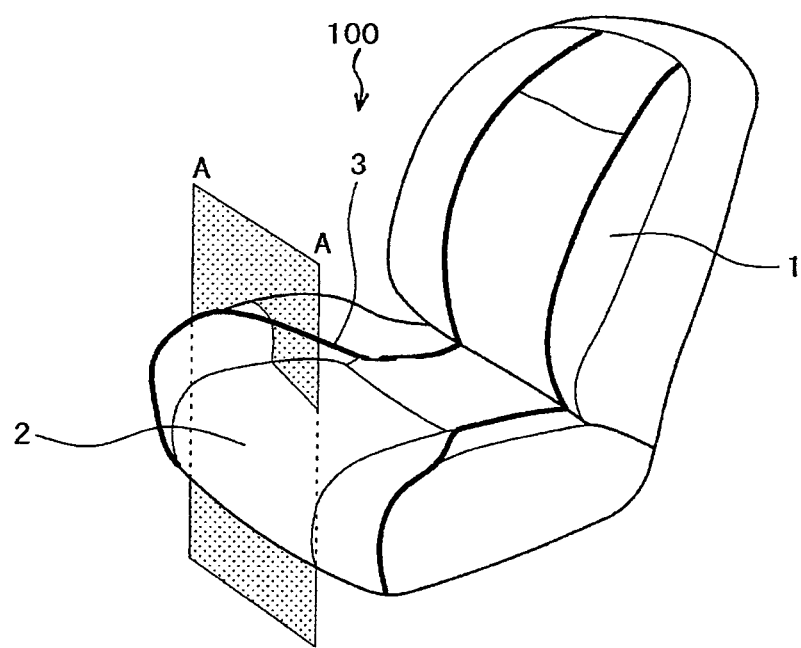
FIG. 1 is a perspective view of a vehicle seat according to the present invention.

The present invention is configured to embed the beading in the groove famed in the seat cushion and the back seat so as to prevent protrusion of the top of the beading from the surface of the seat cushion or the back seat. This makes it possible to prevent the beading that is pressed by the thigh or the back of the driver who is getting on or off the vehicle from being rubbed and worn out with the driver's clothing. This also makes it possible to prevent dislocation of the beading even under the pulling force while having the beading pressed by the thigh or the back of the driver who is getting on or off the vehicle.

Embodiments of the present invention will be described referring to the drawings.

First Embodiment

FIG. 1 is a perspective view of a vehicle seat 100 according to the embodiment. Reference numeral 1 refers to a back seat for supporting the back of the driver or the like, and reference numeral 2 refers to a cushion seat on which the driver or the like is seated.

The back seat 1 and the cushion seat 2 have a pair of beadings 3 as indicated by black thick lines, which are formed at both sides. The respective parts of those seats, on which the pair of beadings 3 are formed are structured to be higher than the parts at the inner side of the beadings 3 (the part of the cushion seat 2, on which the driver or the like is directly seated).

Figure 2:
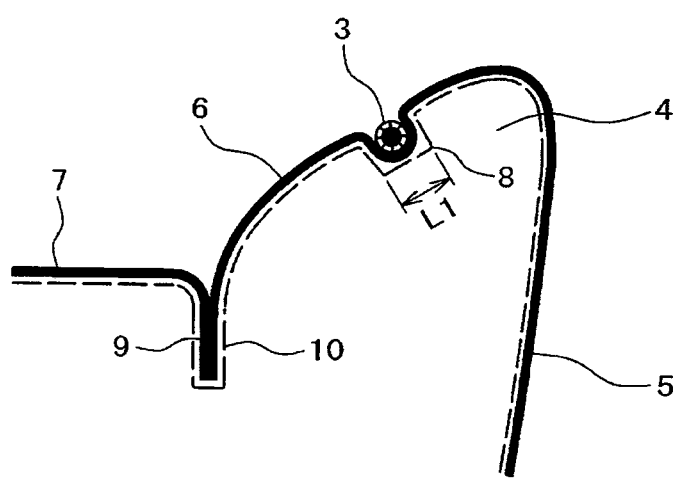
FIG. 2 is a sectional view taken along A-A plane of the vehicle seat according to the present invention as shown in FIG. 1.

FIG. 2 is a sectional view taken along A-A plane of FIG. 1, which is near an edge of the cushion seat 2. The cushion seat 2 is formed by covering the surface of a pad 4 made of resin with surface layers 5, 6, 7. In the state that the surface layers 5, 6, 7 are connected through sewing around the edge of the cushion seat 2, a sewn part 9 formed by sewing the surface layers 6, 7 together is embedded and fixed in a relatively deep groove 10 formed in the pad 4. Meanwhile, a sewn part formed by sewing the surface layers 5, 6 provided with the beading 3 is embedded in a groove 8 formed in the pad 4 so that a top of the beading 3 does not appear upward (protrude) from the surface (seating surface) of the cushion seat 2 when the driver or other occupant is not seated.

Figure 3:
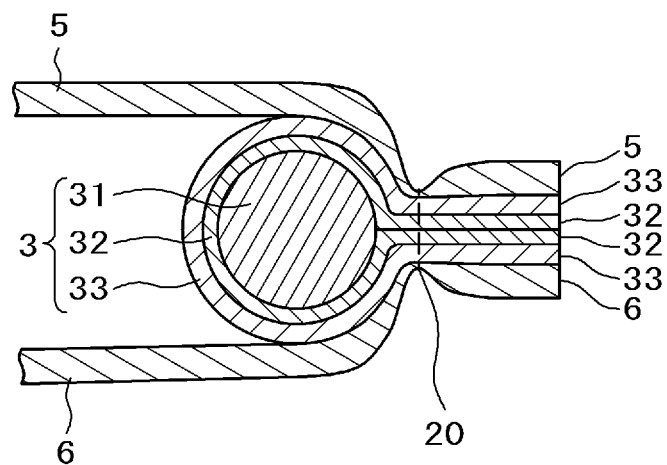
FIG. 3 is a sectional view of a structure according to a first embodiment of the present invention, indicating the state that a beading and a surface layer are laminated and sewn together.

FIG. 3 shows a relationship between the beading 3 and the surface layers 5, 6. The beading 3 is constituted by a core member 31 at its center, a belt-like adhesive sheet 32 which encloses the outer circumference of the core member 31, and a belt-like surface layer 33 which encloses the outer circumference of the belt-like adhesive sheet 32. The belt-like adhesive sheet 32 and the belt-like surface layer 33 of the beading 3 are sewn at a part 20 around an end together with the surface layers 5, 6 so as to be integrated. The belt-like adhesive sheet 32 is the material which hardly exhibits the adhesive property at the ordinary (room) temperature, but exhibits the adhesive property by heating to melt. Accordingly, in the case of sewing at the ordinary (room) temperature, the contact parts between the belt-like adhesive sheets 32 are not brought into bonded together.

Figure 4:
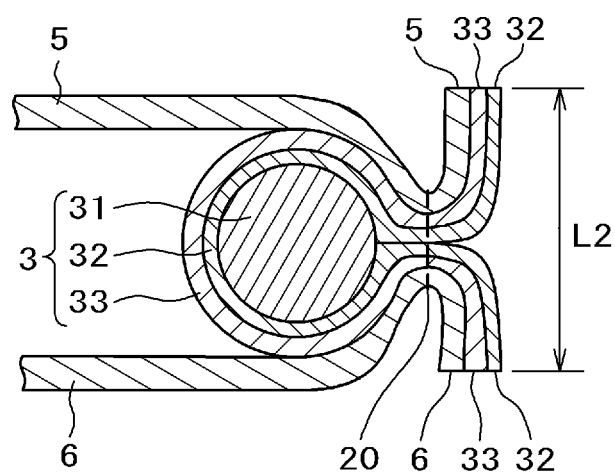
FIG. 4 is a sectional view of the structure according to the first embodiment of the present invention, indicating the state that a seam allowance portion of the laminated and sewn beading and surface layer is branched open to the left and right.
Figure 5:
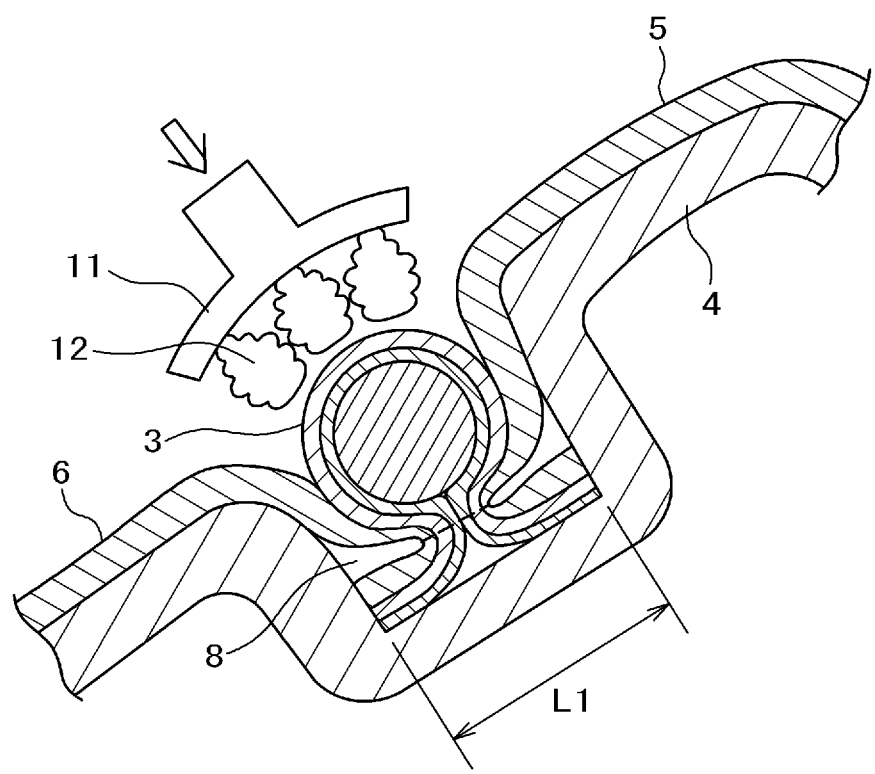
FIG. 5 is a sectional view of the structure including the beading, surface layer and pad in the first embodiment of the present invention, indicating the state that the seam allowance portion of beading and surface layer which are laminated and sewn is branched open to the left and right and inserted into the groove of the pad, and the high-temperature steam is applied to melt the adhesive sheet to bond the beading under pressure.

The end part (seam allowance part) of the thus sewn and integrated adhesive sheet 32 and the surface layer 33 constituting the beading 3, and the surface layers 5, 6 will be branched open to the left and right (upward and downward in FIG. 4) from the sewn part 20 as shown in FIG. 4 so that the belt-like adhesive sheet 32 is exposed to the surface.

The length of the part defined by the sewn part 20 and the end part (seam allowance part) is adjusted so that a length L2 between the left and right ends of the end part branched from the sewn part 20 is smaller than a width dimension L1 of the groove 8 famed in the pad 4.

In the state that the end part of the sewn part is branched open to the left and right, the beading 3 is embedded in the groove 8 formed in the pad 4, and the surface layers 5, 6 spread toward the respective sides along the surface of the pad 4. The depth of the groove 8 in which the beading 3 is embedded is formed so that the top of the beading 3 embedded in the groove 8 is equal in height to the respective surfaces of the surface layers 6, 7 at both sides of the groove 8 when those surface layers 6, 7 which spread from the respective sides of the groove 8 along the surface of the pad 4. The "same height" herein refers to the state that can be regarded as being practicably the same height in spite of slight difference (stepped part) in height.

A presser device 11 jets high-temperature steam 12 toward the beading 3 embedded in the groove 8 of the pad 4 while pressing the beading 3 against the bottom of the groove 8. The belt-like sheet 32 is melted by the heat of the high-temperature steam so that the surface layer 33 enclosing the beading core 31 is bonded to the bottom surface of the groove 8.

In the aforementioned state, the belt-like surface layer 33 for enclosing the beading core 31 is bonded to the beading core 31 via the belt-like adhesive sheet 32.

The beading 3 is pressed against the bottom surface of the groove 8 of the pad 4 for a predetermined period while having the high-temperature steam 12 jetted by the presser device 11. The resultant melted adhesive sheet 32 securely bonds the beading 3 to the bottom surface of the groove 8. Thereafter, jetting of the high-temperature steam is stopped to release the pressure applied to the beading 3 against the bottom surface of the groove 8.

As the beading 3 is securely bonded to the bottom surface of the groove 8 of the pad 4 with the melted adhesive sheet 32, the beading 3 is unlikely to be disengaged from the groove 8 even though superheating by the high-temperature steam is stopped to allow the presser device 11 to release application of the pressure.

The beading 3 is bonded to the bottom surface of the groove 8 of the pad 4, and the top of the beading 3 is equal in height to surfaces of the surface layers 5, 6 which spread across both sides of the pad 4. This makes it possible to prevent the beading pressed by the thigh or the back of the driver or any other occupant who is getting on or off the vehicle from being rubbed and worn out with clothing. This also makes it possible to prevent dislocation of the beading 3 bonded and fixed to the bottom surface of the groove 8 even if the surface layer 5 or 6 is pulled in the state that the beading is pressed by the thigh or the back of the occupant who is getting on or off the vehicle.

Second Embodiment

According to the first embodiment, the beading 3 is bonded to the bottom surface of the groove 8 of the pad 4 using the belt-like adhesive sheet 32. In this embodiment, the adhesive agent is applied to the bottom surface of a groove 81 of the pad 41 without using the belt-like adhesive sheet 32 so that the belt-like surface layer 33 which encloses the beading core 31 of the beading 30 is bonded to the bottom surface of the groove 81.

Figure 6:
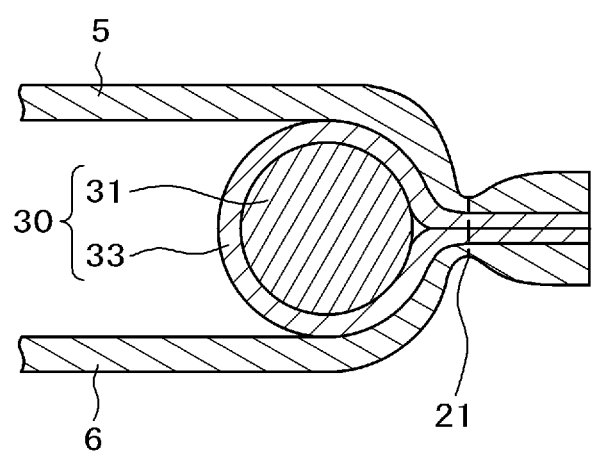
FIG. 6 is a sectional view of a structure according to a second embodiment of the present invention, indicating the state that a beading and a surface layer are laminated and sewn together.

FIG. 6 shows the relationship between a beading 30 and the surface layers 5, 6. The beading 30 is structured by enclosing the outer circumference of the beading core 31 as the center with the belt-like surface layer 33. The belt-like surface layer 33 of the beading 30 is sewn to the surface layers 5, 6 at a part 21 around the end so as to be integrated.

Figure 7:
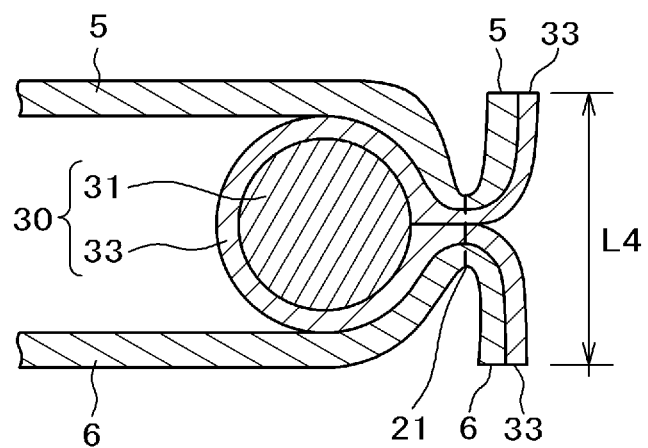
FIG. 7 is a sectional view of the structure according to the second embodiment of the present invention, indicating the state that a seam allowance portion of the laminated and sewn beading and surface layer is branched open to the left and right.

The end part (seam allowance part) of the thus sewn and integrated surface layer 33 of the beading 30, and the surface layers 5, 6 will be branched open to the left and right (upward and downward in FIG. 7) from the sewn part 21 as shown in FIG. 7 so that the surface layer 33 for enclosing the beading core 31 is exposed to the surface.

The length of the part defined by the sewn part 21 and the end part (seam allowance part) is adjusted so that the length L4 between the left and right ends of the end part branched from the sewn part 21 is smaller than the width dimension L3 of the groove 81 formed in the pad 41.

Meanwhile, an adhesive agent 35 is applied to the groove 81 formed in the pad 41. The adhesive agent 35 may be applied to the groove 81 by the following process. That is, a robot (not shown) with its arm provided with a dispenser at the leading end is taught with respect to the position (route) of the groove 81 formed in the pad 41 so that a predetermined amount of the adhesive agent 35 is applied to the inside of the groove 81 while moving the dispenser with the robot arm along the groove 81.

Figure 8:
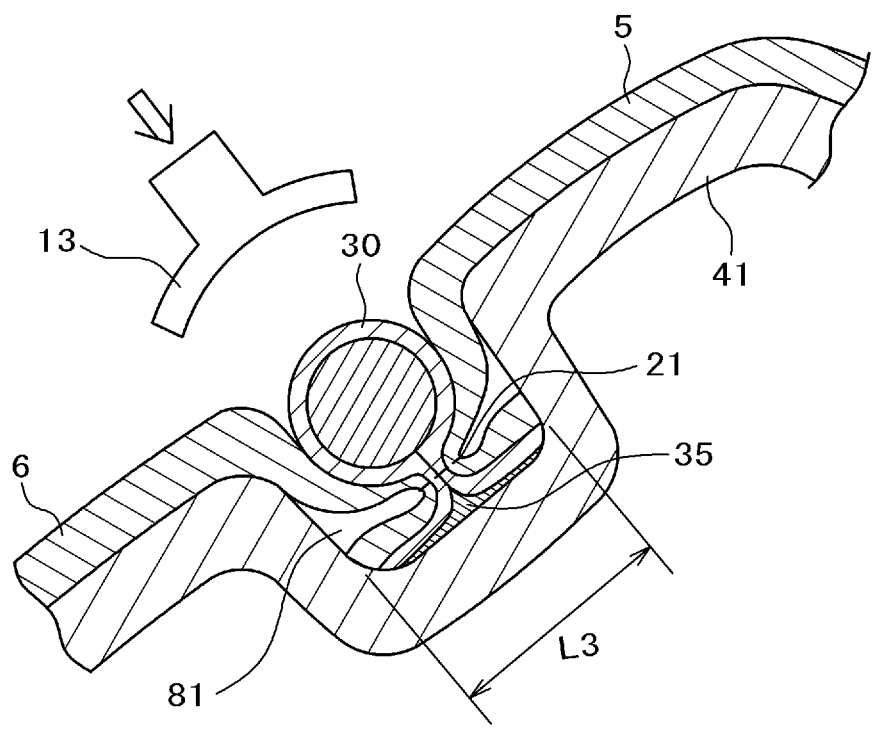
FIG. 8 is a sectional view of the structure including the beading, surface layer, and pad according to the second embodiment of the present invention, indicating the state that the seam allowance portion of beading and surface layer which are laminated and sewn is branched open to the left and right and inserted into the groove of the pad, and the adhesive agent is applied so that the beading is bonded to the groove under pressure.

In the state that the end part of the sewn part is branched open to the left and right as shown in FIG. 8, the beading 30 is embedded in the groove 81 formed in the pad 41, to which the adhesive agent 35 has been applied so that the surface layers 5, 6 spread toward the respective sides of the groove 81 along the surface of the pad 41. The depth of the groove 81 in which the beading 30 is embedded is formed so that the top of the beading 30 embedded in the groove 81 is equal in height to each surface of the surface layers 6, 7 which spreads from both sides of the groove 81 along the surface of the pad 41. The "same height" herein refers to the state that can be regarded as being practicably the same height in spite of slight difference (stepped part) in height.

In the state that the beading 30 is embedded in the groove 81 of the pad 41, a presser device 13 presses the beading 30 against the bottom of the groove 81, to which the adhesive agent 35 is applied so that the surface layer 33 for enclosing the beading core 31 of the beading 30 is bonded to the bottom surface of the groove 81 with the adhesive agent 35.

The presser device 13 is used to press the beading 30 against the bottom surface of the groove 81 of the pad 41 for a predetermined period of time so that the beading 30 is securely bonded to the bottom surface of the groove 81. Thereafter, the pressure applied to the beading 30 against the bottom surface of the groove 81 is released.

As the beading 30 is securely bonded to the bottom surface of the groove 81 with the adhesive agent 35, the beading 30 is unlikely to be disengaged from the groove 81 even if the pressure applied by the presser device 13 is released.

The beading 30 is bonded to the bottom surface of the groove 81 of the pad 41, and the top of the beading 30 is substantially equal in height to each surface of the surface layers 5, 6 at both sides. This makes it possible to prevent the beading pressed by the thigh or the back of the driver or any other occupant who is getting on or off the vehicle from being rubbed and worn out with clothing. This also makes it possible to prevent dislocation of the beading 30 bonded and fixed to the bottom surface of the groove 81 even if the surface layer 5 or 6 is pulled in the state that the beading is pressed by the thigh or the back of the occupant who is getting on or off the vehicle.

INDUSTRIAL APPLICABILITY

The present invention may be applied to the vehicle seats for passenger car, truck, and bus, and further applied to the seats for airplane, passenger ship, and train.

LIST OF REFERENCE SIGNS

1: back seat,
2: cushion seat,
3, 30: beading,
4, 41: pad,
5, 6, 7: surface layer,
8, 81: groove,
11, 13: presser device,
31: beading core,
32: adhesive sheet,
33: surface layer,
100: vehicle seat

The invention claimed is:

1. A vehicle seat comprising:
a pad;
one or more first surface layers covering the pad; and
a beading having a beading core and a second surface layer,
wherein:
the pad has a groove in which the beading is embedded;
the second surface layer encloses the beading core and is bonded and fixed to a bottom surface of the groove;
the beading has a seam allowance part where the one or more first surface layers and the second surface layer are sewn together; and
the seam allowance part is branched open in opposite directions and is bonded and fixed to the bottom surface of the groove formed in the pad.

2. The vehicle seat according to claim 1, wherein:
a circumference of the beading core as a core member is enclosed by an adhesive sheet;
a surface of the adhesive sheet is covered by the second surface layer; and
the seam allowance part is bonded and fixed to the bottom surface of the groove by a melted portion of the adhesive sheet contacting the bottom surface of the groove.

3. The vehicle seat according to claim 2, wherein the adhesive sheet is formed of a material that melts in response to heating from application of steam to the beading.

4. The vehicle seat according to claim 2, wherein:
the adhesive sheet is constructed as a planar sheet that is wrapped around a circumference of the beading core; and
the planar sheet is formed of a material that lacks an adhesive feature at a room temperature, and, after heating with steam, has the adhesive feature for bonding and fixing the beading to the bottom surface of the groove.

5. The vehicle seat according to claim 1, wherein:
a circumference of the beading core as a core member is covered by the second surface layer; and
the seam allowance part is bonded and fixed to the bottom surface of the groove by an adhesive agent applied to the bottom surface of the groove.

6. The vehicle seat according to claim 1, wherein a top of the beading embedded in the groove formed in the pad is equal in height to an upper surface of the one or more first surface layers which cover sides of the groove formed in the pad.

7. A vehicle seat comprising:
a pad;
one or more first surface layers covering the pad; and
a beading having a beading core and a second surface layer,
wherein:
the pad has a groove in which the beading is embedded;
the beading is sewn to the one or more first surface layers and is embedded in the groove formed in the pad so that a top of the beading is equal in height to an upper surface of the one or more first surface layers that cover sides of the groove formed in the pad;

the second surface layer encloses the beading core and is bonded and fixed to a bottom surface of the groove;

the beading has a seam allowance part where the one or more first surface layers and the second surface layer are sewn together; and the seam allowance part is branched open in opposite directions and is bonded and fixed to the bottom surface of the groove formed in the pad.

8. The vehicle seat according to claim 7, wherein:

a circumference of the beading core as a core member is enclosed by an adhesive sheet;

a surface of the adhesive sheet is covered by the second surface layer;

the seam allowance part is bonded and fixed to the bottom surface of the groove by a melted portion of the adhesive sheet contacting the bottom surface of the groove; and the adhesive sheet is formed of a material that melts in response to heating from application of steam to the beading.

9. The vehicle seat according to claim 8, wherein:

the adhesive sheet is constructed as a planar sheet that is wrapped around a circumference of the beading core; and the planar sheet is formed of a material that lacks an adhesive feature at a room temperature, and, after heating with steam, has the adhesive feature for bonding and fixing the beading to the bottom surface of the groove.

10. The vehicle seat according to claim 7, wherein:

a circumference of the beading core as a core member is covered by the second surface layer; and the seam allowance part is bonded and fixed to the bottom surface of the groove by an adhesive agent applied to the bottom surface of the groove.

* * * * *